United States Patent
Lin et al.

(10) Patent No.: US 7,624,286 B2
(45) Date of Patent: Nov. 24, 2009

(54) POWER MANAGEMENT METHOD OF NORTH BRIDGE

(75) Inventors: Ruei-Ling Lin, Hsin-Tien (TW); Jiin Lai, Cupertino, CA (US); Hung-Yi Kuo, Hsin-Tien (TW)

(73) Assignee: VIA Technologies, Inc., Taipei (TW)

( * ) Notice: Subject to any disclaimer, the term of this patent is extended or adjusted under 35 U.S.C. 154(b) by 345 days.

(21) Appl. No.: 11/215,222

(22) Filed: Aug. 30, 2005

(65) Prior Publication Data

US 2006/0174142 A1 Aug. 3, 2006

(51) Int. Cl.
*G06F 1/00* (2006.01)
*G06F 1/32* (2006.01)

(52) U.S. Cl. .................. 713/300; 713/320; 713/322; 365/226; 365/227

(58) Field of Classification Search ............. 713/300, 713/320, 322; 365/226, 227
See application file for complete search history.

(56) References Cited

U.S. PATENT DOCUMENTS

| | | | | |
|---|---|---|---|---|
| 4,617,639 A | * | 10/1986 | Paine | 701/35 |
| 6,988,217 B1 | * | 1/2006 | Madrid et al. | 713/500 |
| 6,996,728 B2 | * | 2/2006 | Singh | 713/300 |
| 7,441,128 B2 | * | 10/2008 | Ho et al. | 713/300 |
| 2002/0078391 A1 | * | 6/2002 | Yeh | 713/322 |
| 2003/0204759 A1 | | 10/2003 | Singh | |
| 2005/0039063 A1 | * | 2/2005 | Hsu et al. | 713/324 |
| 2005/0289369 A1 | * | 12/2005 | Chung et al. | 713/300 |
| 2006/0053310 A1 | * | 3/2006 | Su et al. | 713/300 |
| 2006/0187226 A1 | * | 8/2006 | Bruno et al. | 345/534 |
| 2006/0280018 A1 | * | 12/2006 | Cases et al. | 365/226 |

FOREIGN PATENT DOCUMENTS

| | | |
|---|---|---|
| TW | 594466 | 6/2004 |
| TW | I220941 | 9/2004 |
| TW | 200506591 | 2/2005 |
| WO | 03073244 | 9/2003 |

OTHER PUBLICATIONS

TW Office Action mailed Sep. 26, 2008.
English Abstract of TW594466.
English Abstract of TW200506591.
English Abstract of TW I220941.

* cited by examiner

*Primary Examiner*—Thomas Lee
*Assistant Examiner*—Michael J Brown
(74) *Attorney, Agent, or Firm*—Thomas, Kayden, Horstemeyer & Risley

(57) ABSTRACT

A power state management method of north bridge. The north bridge monitors power transition state of processor; then adjusting operating clocks and operating voltage of the processor and the main memory according to the determined power state to saving power consumption.

17 Claims, 4 Drawing Sheets

| | C0t | C1 | C2 | C3d | C3 | S1 |
|---|---|---|---|---|---|---|
| Processor clocks | Low | Low | Low | Low | Low | Stopped |
| Processor voltage | Reduced | Reduced | Reduced | Reduced | Reduced | Reduced |
| Main memory operating clocks | Low | Low | Low | Stopped | Low | Stopped |
| Main memory operating voltage | Reduced | Reduced | Reduced | Reduced | Reduced | Reduced |
| DRAM self-refresh | | | | Self-refresh | Self-refresh | Self-refresh |
| Page mode or non-page mode | Non-page mode | Non-page mode | Non-page mode | | | |
| Northbridge shutdown | | | | Shutdown | | Shutdown |

FIG. 4

POWER MANAGEMENT METHOD OF NORTH BRIDGE

CROSS-REFERENCE TO RELATED APPLICATION

This application is related to the co-pending U.S. patent application Ser. No. 11/048,191 with title "Traffic analyzer and power state management thereof", which has been filed on 2005 Feb. 1, and which has common assignee and common inventors.

BACKGROUND

The present invention relates to a power state management method, and in particular, to a power state management method of north bridge.

Power management is a significant issue in computer design, especially for mobile computing devices. Desired long battery life requires smart and aggressive power management. Units operating at high clock frequencies in a computer system such as central processing units (CPUs), main memories (random access memories, hereafter referred to as RAMs), and chipsets typically consume more power than other units. Those high clock operation units make power management thereof critical.

Advanced Configuration and Power Interface (ACPI) specification 2.0 provides several methods of transitioning computer power states via operating system-directed configuration and power management (OSPM), by which an operating system and a south bridge may transit a computer system through S0, S1, S2, S3, S4, S5 states; and a processor among C0, C1, C2, C3, C4, and other power states.

ACPI defined Processor power states C0~C3 and system states S0~S5 are briefly described as follows.

C0 Processor power state: processor executes instructions in this state.

C1 Processor power state: having the lowest latency. A processor is able to maintain the context of system caches.

C2 Processor power state: the state offers improved power savings over the C1 state. A processor is assumed capable of keeping its caches coherent and is able to snoop accessing to main memory.

C3 Processor power state: the state offers improved power savings over the C1 and C2 states. A processor's caches maintain state but the processor isn't required to snoop accessing to main memory. The operating system power management (OSPM) ensures that the caches maintain coherency.

S0 system state: S0 is the system working state. Processors thereof are in the C0, C1, C2, or C3 states. The processor-complex context is maintained and instructions are executed as defined by any of these processor states. Dynamic RAM context is maintained and is read/written by the processors.

S1 sleeping state: S1 state is a low wake latency sleeping state. The processor-complex context is maintained and the processor doesn't execute instructions. Dynamic RAM context is maintained.

S2 sleeping state: S2 state is a low wake latency sleeping state. S2 state conserves more power than S1 state. The processor-complex context isn't maintained and the processor doesn't execute instructions. Dynamic RAM context is maintained. S2 sleeping state is similar to S1 sleeping state except losing the processor-complex context (OS maintains the cache and CPU context).

S3 sleeping state: S3 state is a low wake latency sleeping state. S3 state conserves more power than S2 state. The processor-complex context isn't maintained and the processor does not execute instructions. Dynamic RAM context is maintained.

S4 sleeping state: S4 state is the lowest power, longest wake latency sleeping state supported by ACPI. S4 state conserves more power than S3 state. In the S4 state, the processor does not execute instructions. Both processor-complex context and dynamic RAM context are not maintained.

S5 soft off state: S5 state is similar to the S4 state except that the OSPM does not save any context. The computer system in S5 soft off state requires a complete boot when awakened.

Processor power states affect main memory and chipset activity as well as system states. Power consumption of main memories and chipsets, however, is not well managed with regard to processor power states in conventional computer systems or the ACPI specification.

Typically, a power state machine is built in south bridge; however, conventional north bridge connecting between CPUs and main memories cannot manage power states thereof.

SUMMARY

The invention provides a power state management method of north bridge.

The power state management method in NB of the present invention including: monitoring a power state control signal which directs state transition of processor; determining to which one of the states that the processor being transited according to the power state control signal; and adjusting operating frequency and operating voltage of the processor and the main memory according to the determined state.

The present invention also provides a north bridge capable of power state management. The north bridge includes: a traffic monitor for monitoring power state control signals of a processor; a state machine for determining to which one of states that the processor being transited according to the power management control signals; a power management unit for adjusting operating frequency and operating voltage of the processor and a main memory according to the determined state.

DESCRIPTION OF THE DRAWINGS

The invention can be more fully understood by reading the subsequent detailed description and examples with references made to the accompanying drawings, wherein:

FIG. 4 is a power management action table.

DETAILED DESCRIPTION

The invention provides a power states management method of north bridge.

Figure 1:
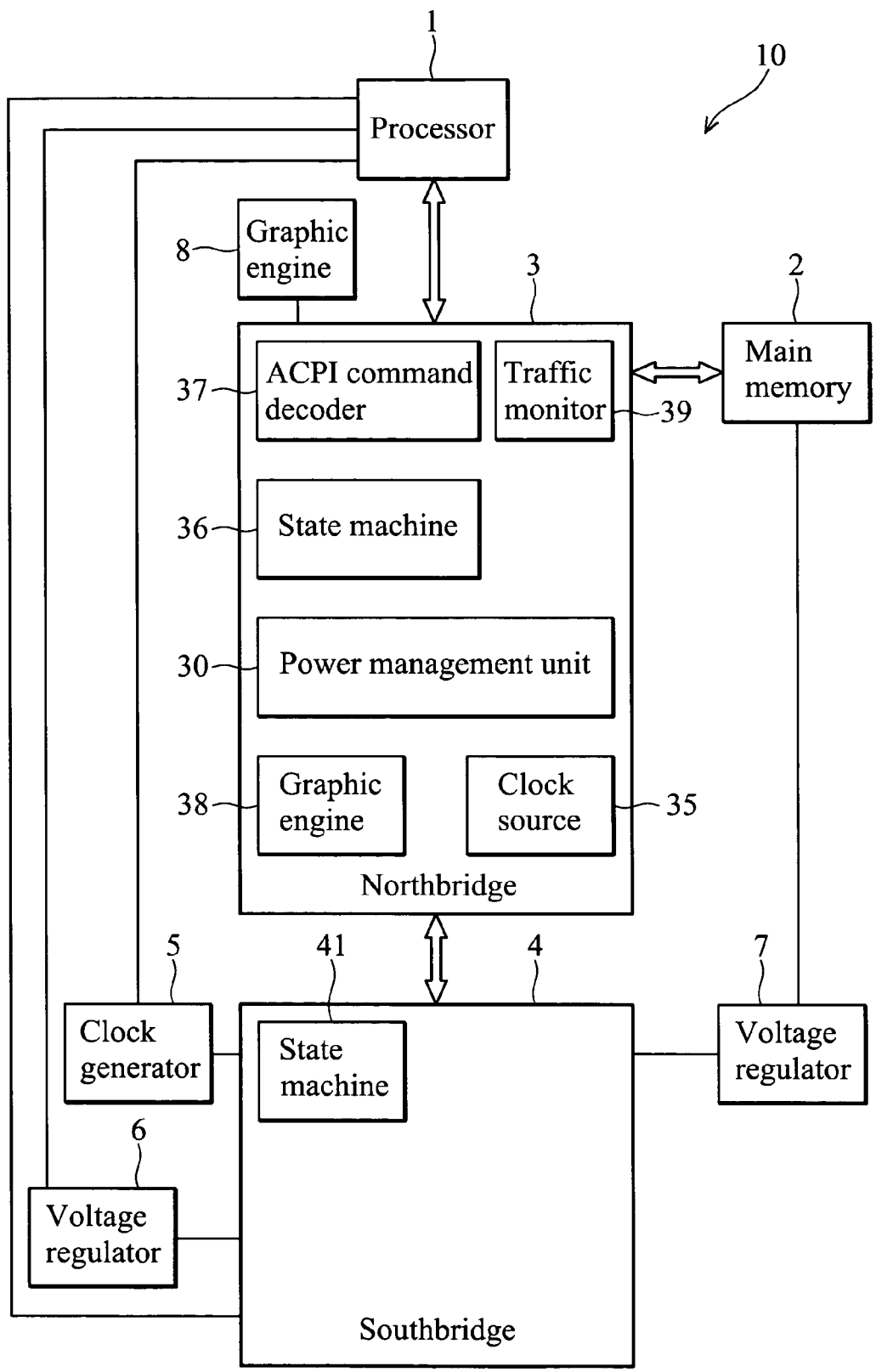
FIG. 1 is a block diagram of configuration of a computer according to embodiments of the invention.

FIG. 1 shows a computer system 10 with power states management in north bridge of the present invention.

The computer system 10 includes: a processor 1; a main memory 2; a north bridge (NB) 3 connecting between processor 1 and main memory 2; and a south bridge (SB) 4, connecting to NB 3; a voltage regulator 7 connecting between SB 4 and main memory 2; and a clock generator 5 and another voltage regulator 6 connecting between processor 1 and SB 4. It is well known by one skilled in the arts that computer system 10 may include additional processors.

In the present invention, NB 3 with capable of power state management including: a traffic monitor 39 monitoring power state transition of processor 1 according to a power state control signal; an ACPI command decoder 37 decoding the power state control signal; a state machine 36 determining which one of states that the processor being transited to according to the decoded power state control signal; and a power management unit 30 adjusting operating clock and operating voltage of processor 1 and main memory 2 according to the determined state.

In the present invention, SB 4 could also have a state machine 41 with same portion or all of ACPI system states and processor states as state machine 36.

Figure 2A:
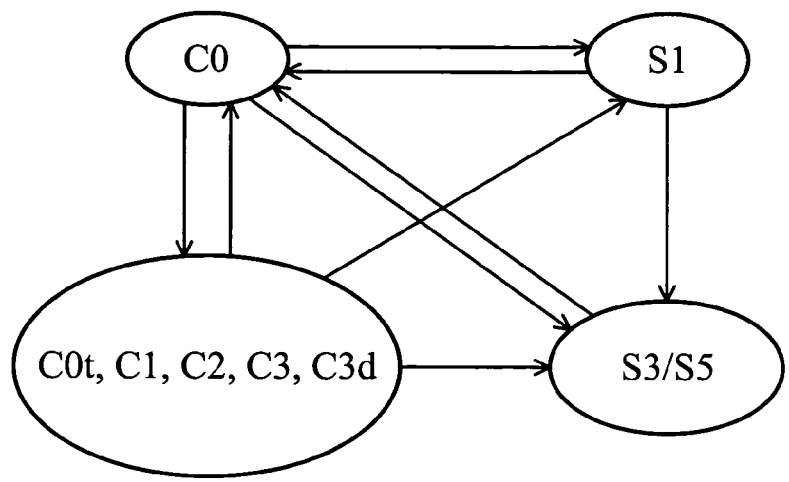
FIG. 2A is a schematic diagram of states and transition thereof in an exemplary machine built in a NB according to embodiments of the invention.

FIG. 2A is a diagram of NB processor power states in state machine 36 and 41 of the present invention. Wherein C0 is a processor running state; C1 is halt command state; C2 is a processor level 2 state; C3 is a processor level 3 state; C0$t$ is a C0 throttle state with processor operating clock and operating voltage being reduced; and C3$d$ is a C3 state with graphic engine 8 being shutdown.

Figure 2B:
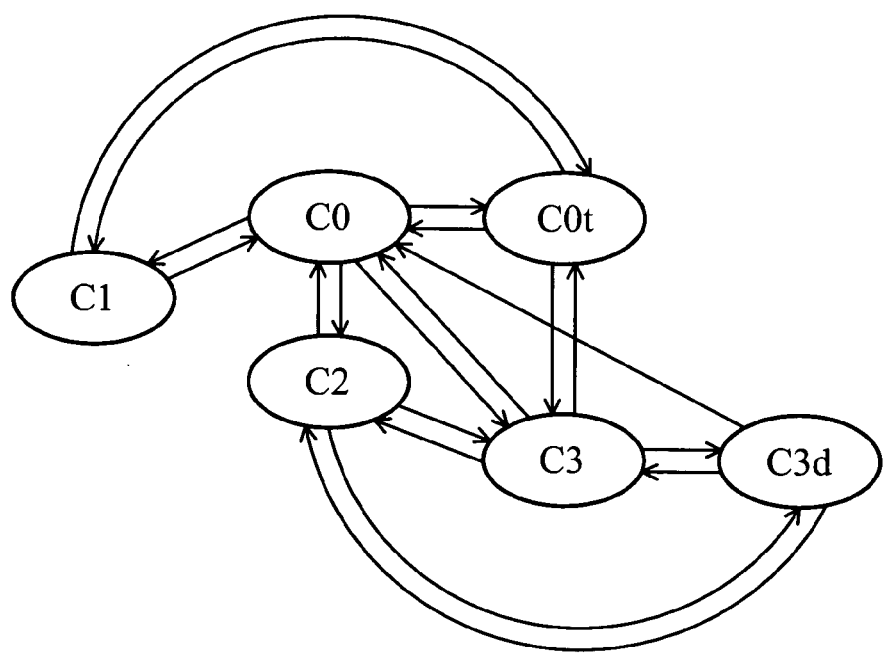
FIG. 2B is a schematic diagram showing C0, C0t, C1, C2, C3 states and transition thereof in the machine in FIG. 2A.

FIG. 2B is a diagram of NB processor/system power state. C0 is the processor running state; Cx is other processor state in FIG. 2A. S1 is a power-on suspend-to-Ram state. S3 is a power-off suspend-to-disk state. S5 is a power-off state.

Arrows in FIGS. 2A and 2B represent possible state transitions in computer system 10.

Figure 3:
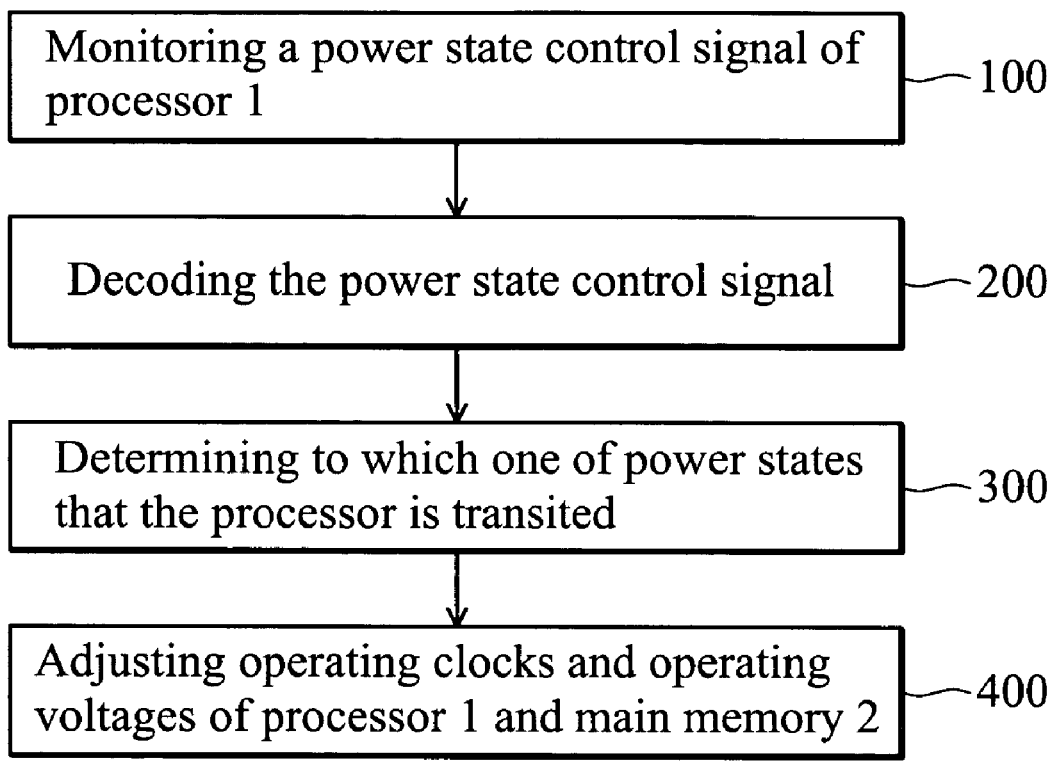
FIG. 3 is a flowchart of power management performed by a NB according to embodiments of the invention.

FIG. 3 is a flowchart of power management performed in NB 3 of the present invention.

Firstly, traffic monitor 39 monitors a power state control signal of processor 1 (step 100). Then ACPI command decoder 39 decodes the power state control signal (step 200). State machine 36 determines to which one of states that processor 1 is transited according to the decoded power state control signal (step 300). Finally, Power management unit adjusts operating clocks and operating voltage of processor 1 and main memory 2 according to the power state machine and the determined state (step 400).

In the present invention, operating clocks and operating voltage of processor 1 are respectively adjusted by clock generator 5 and voltage regulator 6. Operating clocks and operating voltage of main memory 2 are respectively adjusted by clock source 35 and voltage regulator 7.

FIG. 4 shows a proposed power management action table of the present invention. It is noticed that the action table could be activated or disabled according to user preference.

According to the table, operating clocks and operating voltage of both processor 1 and main memory 2 are accordingly adjusted with respect to the transited state.

This table summarizes the power state management of the NB 3. Some power state management functions corresponding to the entire table may be activated or disabled according to user preference.

In C3 state, processor 1 rejects snooping and ignores interrupts with respect to the ACPI specification. If there has no more transactions pended in NB 3, graphic engine 8 keeps displaying and accessing DRAM, and commands main memory 2 to enter self-refresh mode. Both NB 3 and main memory 2 are pushed into the most power saving states.

In C3$d$ state, if there has no more transactions pended in NB 3, graphic engine 8 stops displaying, enters D3 state (as defined in ACPI specification), and commands main memory 2 to enter self-refresh mode. In C3$d$ state, NB 3 is shutdown, and Phase-locked loop (PLL) thereof is disabled.

A power state management method of north bridge is proposed in the present invention. The dynamical adjusting of operating clocks and operating voltage could achieve improved performance and power consumption according to the traffic monitor in north bridge. With the built-in power state machine, north bridge is capable of aggressively managing the north bridge power and the memory power with comparing to the north bridge without the knowledge of power state.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power management method of a north bridge for managing power state of a processor and a main memory in a computer system, comprising:
    monitoring power state transition of the processor;
    accordingly adjusting operating clocks and operating voltages of the processor and the main memory utilizing a power state machine; and
    reducing operating clocks and operating voltages of the processor and the main memory, and pre-charging opened pages in the main memory if no memory access is detected, while the processor is at a rower saving state.

2. The method of claim 1, wherein the step of monitoring power state transition further comprising:
    monitoring a power state control signal of the processor;
    decoding the power state control signal to determine to which one of power states that the processor is transited; and
    determining the corresponding operating clocks and operating voltages of the processor and the main memory according to the power state machine in the north bridge.

3. The method of claim 1, wherein the power saving state is either a C0$t$ state (throttle state), a C1 state, or a C2 state.

4. The method of claim 1, when the computer system is at a S1 state, the method further comprises:
    stopping operating clock of the processor and reducing operating voltage of the processor;
    commanding the main memory to enter self-refresh mode; and
    disabling PLL of the north bridge.

5. The method of claim 1, wherein while the processor is at a C3$d$ state, a graphic engine is shutdown, and the C3$d$ state is within a C3 state.

6. A computer system comprises:
    a processor;
    a north bridge connecting to the processor;
    a main memory connecting to the north bridge;
    a south bridge connecting to the north bridge;
    wherein the north bridge is in charge of power state management of the computer system, the north bridge reduces operating clocks and operating voltages of the processor and the main memory while the processor is at a power saving state, and the main memory is in a non-page mode.

7. The computer system of claim 6 further comprising:
a clock generator connecting between the processor and the south bridge for adjusting operating clocks of the processor;
a first voltage regulator connecting between the processor and the south bridge for adjusting operating voltage of the processor;
a second voltage regulator connecting between the main memory and the south bridge for adjusting operating voltage of the main memory; and
a clock source within the north bridge for adjusting operating clocks of the main memory.

8. The computer system of claim 7, wherein the north bridge comprises:
a traffic monitor for monitoring power state transition of the processor;
a power state machine, comprising C0$t$ state, C1 state, C2 state, C3 state and S1 state, determining to which power state the processor is transited according to the monitoring; and
a power management control unit for controlling the clock generator, the first voltage regulator, the second voltage regulator and the clock source to adjust operating clocks and operating voltage of the processor and the main memory according to the power state machine and the determined power state.

9. The computer system of claim 6, wherein the power saving state is either a C0$t$ state (throttle state), a C1 state, or a C2 state.

10. The computer system of claim 6, wherein, when the computer system is at a S1 state, the south bridge stops operating clock of the processor, the first voltage regulator reduces operating voltage of the processor, the main memory is in self-refresh mode, and a PLL of the north bridge is disabled.

11. The computer system of claim 6, wherein while the processor is at a C3$d$ state, a graphic engine is shutdown, and the C3$d$ state is within a C3 state.

12. A memory bridge with capable of power state management of a computer system, wherein the computer system further comprises a processor and a main memory system, the method comprises:
a traffic monitor for monitoring power state transition of the processor;
a power state machine determining to which power state the processor is transited according to the monitoring; and
a power management control unit adjusting operating clocks and operating voltages of the processor and the main memory according to the power state machine and the determined power state,
wherein, while the processor is at a rower saving state, the rower management control unit reduces operating clocks and operating voltages of the processor and of the main memory respectively, and the main memory is in a non-page mode.

13. The memory bridge of claim 12, further comprising an ACPI decoder for decoding a power state control signal which shows power state transition of the processor.

14. The memory bridge of claim 12, wherein the power saving state machine comprises is either a C0$t$ state (throttle state), a C1 state, or a C2 state.

15. The memory bridge of claim 12, wherein, when the computer system is at a S1 state, the power management control unit stops operating clock of the processor and reduces operating voltage of the processor, wherein the main memory is in self-refresh mode, and PLL of the memory bridge is disable.

16. The memory bridge of claim 12, wherein while the processor is at a C3$d$ state, a graphic engine is shutdown, and the C3$d$ state is within a C3 state.

17. The memory bridge of claim 12, wherein the memory bridge is a north bridge.

* * * * *